US011720132B2

(12) United States Patent
Chang

(10) Patent No.: US 11,720,132 B2
(45) Date of Patent: Aug. 8, 2023

(54) VOLTAGE REGULATION CIRCUIT

(71) Applicant: GUTSCHSEMI LIMITED, Hong Kong (HK)

(72) Inventor: Kuo-Wei Chang, Taipei (TW)

(73) Assignee: GUTSCHSEMI LIMITED, Hong Kong (HK)

(*) Notice: Subject to any disclaimer, the term of this patent is extended or adjusted under 35 U.S.C. 154(b) by 0 days.

(21) Appl. No.: 17/717,126

(22) Filed: Apr. 10, 2022

(65) Prior Publication Data

US 2023/0152831 A1 May 18, 2023

Related U.S. Application Data

(60) Provisional application No. 63/280,555, filed on Nov. 17, 2021.

(30) Foreign Application Priority Data

Feb. 8, 2022 (TW) .................................. 111104622

(51) Int. Cl.
*G05F 1/575* (2006.01)
*H02M 1/15* (2006.01)
*G05F 1/46* (2006.01)

(52) U.S. Cl.
CPC .............. *G05F 1/575* (2013.01); *G05F 1/461* (2013.01); *H02M 1/15* (2013.01)

(58) Field of Classification Search
None
See application file for complete search history.

(56) References Cited

U.S. PATENT DOCUMENTS

| 9,577,508 B2* | 2/2017 | Wang ...................... H02M 1/15 |
| 10,254,777 B2* | 4/2019 | Duong .................... G05F 1/575 |
| 11,531,361 B2* | 12/2022 | Joshi ....................... G05F 1/575 |
| 2003/0214275 A1 | 11/2003 | Biagi |

(Continued)

FOREIGN PATENT DOCUMENTS

| CN | 102591393 | 7/2012 |
| TW | 200736875 | 10/2007 |

(Continued)

OTHER PUBLICATIONS

"Office Action of Taiwan Counterpart Application", dated Dec. 5, 2022, p. 1-p. 7.

*Primary Examiner* — Jeffery S Zweizig
(74) *Attorney, Agent, or Firm* — JCIPRNET

(57) ABSTRACT

A voltage regulation circuit is provided. The voltage regulation circuit includes an error amplifier, an output transistor, a noise extraction circuit, and a stabilization circuit. The error amplifier provides a control signal in response to changes in a feedback voltage. The output transistor receives an input voltage signal, and adjusts an output voltage signal at an output terminal of the voltage regulation circuit in response to the control signal and the input voltage signal. The noise extraction circuit extracts a noise of the input voltage signal to provide a noise current signal. The stabilization circuit converts the noise current signal into a stable signal. In a high operating frequency range, the stabilization circuit provides the stable signal to a control terminal of the output transistor to cancel interference caused by the noise of the input voltage signal.

14 Claims, 5 Drawing Sheets

(56) References Cited

U.S. PATENT DOCUMENTS

| | | |
|---|---|---|
| 2008/0084196 A1 | 4/2008 | Lacombe et al. |
| 2008/0303492 A1 | 12/2008 | Aiura et al. |
| 2014/0103890 A1 | 4/2014 | Naidu et al. |
| 2014/0340058 A1 | 11/2014 | Wang |
| 2015/0198959 A1 | 7/2015 | Kuttner |
| 2017/0126329 A1 | 5/2017 | Gorecki et al. |
| 2017/0194855 A1 | 7/2017 | Petenyi |
| 2017/0220058 A1 | 8/2017 | Petenyi et al. |
| 2017/0315574 A1 | 11/2017 | Brown et al. |
| 2018/0120875 A1 | 5/2018 | Suzuki |
| 2021/0080987 A1 | 3/2021 | Rodriguez et al. |

FOREIGN PATENT DOCUMENTS

| | | |
|---|---|---|
| TW | 201011492 | 3/2010 |
| TW | 202001471 | 1/2020 |

\* cited by examiner

VOLTAGE REGULATION CIRCUIT

CROSS-REFERENCE TO RELATED APPLICATION

This application claims the priority benefit of U.S. provisional application Ser. No. 63/280,555, filed on Nov. 17, 2021, and Taiwan application serial no. 111104622, filed on Feb. 8, 2022. The entirety of each of the above-mentioned patent applications is hereby incorporated by reference herein and made a part of this specification.

BACKGROUND

Technical Field

The disclosure relates to a voltage regulation circuit and more particularly, to a voltage regulation circuit having a high power supply rejection ratio (PSRR) in a high operating frequency range.

Description of Related Art

A voltage regulation circuit, such as a low dropout (LDO) regulation circuit, receives an input voltage signal to generate an output voltage signal, and regulates the output voltage signal. The performance of the voltage regulation circuit may be evaluated based on a power supply rejection ratio (PSRR). When the PSRR is greater, the output voltage signal is less affected by a noise (i.e., a ripple) of the input voltage signal. The higher the PSRR, the more advantageous the design of the post-stage circuit will be. Moreover, when the PSRR is smaller, the output voltage signal is more affected by the noise of the input voltage signal. Therefore, how to improve the PSRR of the voltage regulation circuit is one of the research focuses of those skilled in the art.

However, at high operating frequencies, the loop gain of the LDO is reduced because the operating bandwidth is limited, and the PSRR decreases. Therefore, the PSRR performance of the voltage regulation circuit at high operating frequencies must be considered.

SUMMARY

The disclosure provides a voltage regulation circuit with a high power supply rejection ratio (PSRR) in a high operating frequency range.

The voltage regulation circuit of the disclosure includes an error amplifier, an output transistor, a noise extraction circuit, and a stabilization circuit. The error amplifier provides a control signal in response to changes in a feedback voltage. The voltage value of the feedback voltage is related to the voltage value at the output terminal of the voltage regulation circuit. The control terminal of the output transistor is coupled to the output terminal of the error amplifier. The output transistor receives an input voltage signal, and adjusts an output voltage signal at the output terminal of the voltage regulation circuit in response to the control signal and the input voltage signal. The noise extraction circuit extracts a noise of the input voltage signal to provide a noise current signal. The stabilization circuit is coupled to the noise extraction circuit. The stabilization circuit converts the noise current signal into a stable signal, and provides the stable signal to the control terminal of the output transistor in the high operating frequency range to cancel the interference caused by the noise of the input voltage signal.

Based on the above, the voltage regulation circuit of the disclosure extracts the noise of the input voltage signal to provide the noise current signal. In the high operating frequency range, the voltage regulation circuit can utilize the noise current signal to cancel the interference caused by the noise accompanying the input voltage signal, thereby stabilizing the output voltage signal. In this way, the voltage regulation circuit has a high PSRR in the high operating frequency range.

In order to make the aforementioned features and advantages of the disclosure comprehensible, embodiments accompanied with drawings are described in detail below.

DESCRIPTION OF THE EMBODIMENTS

Figure 1:
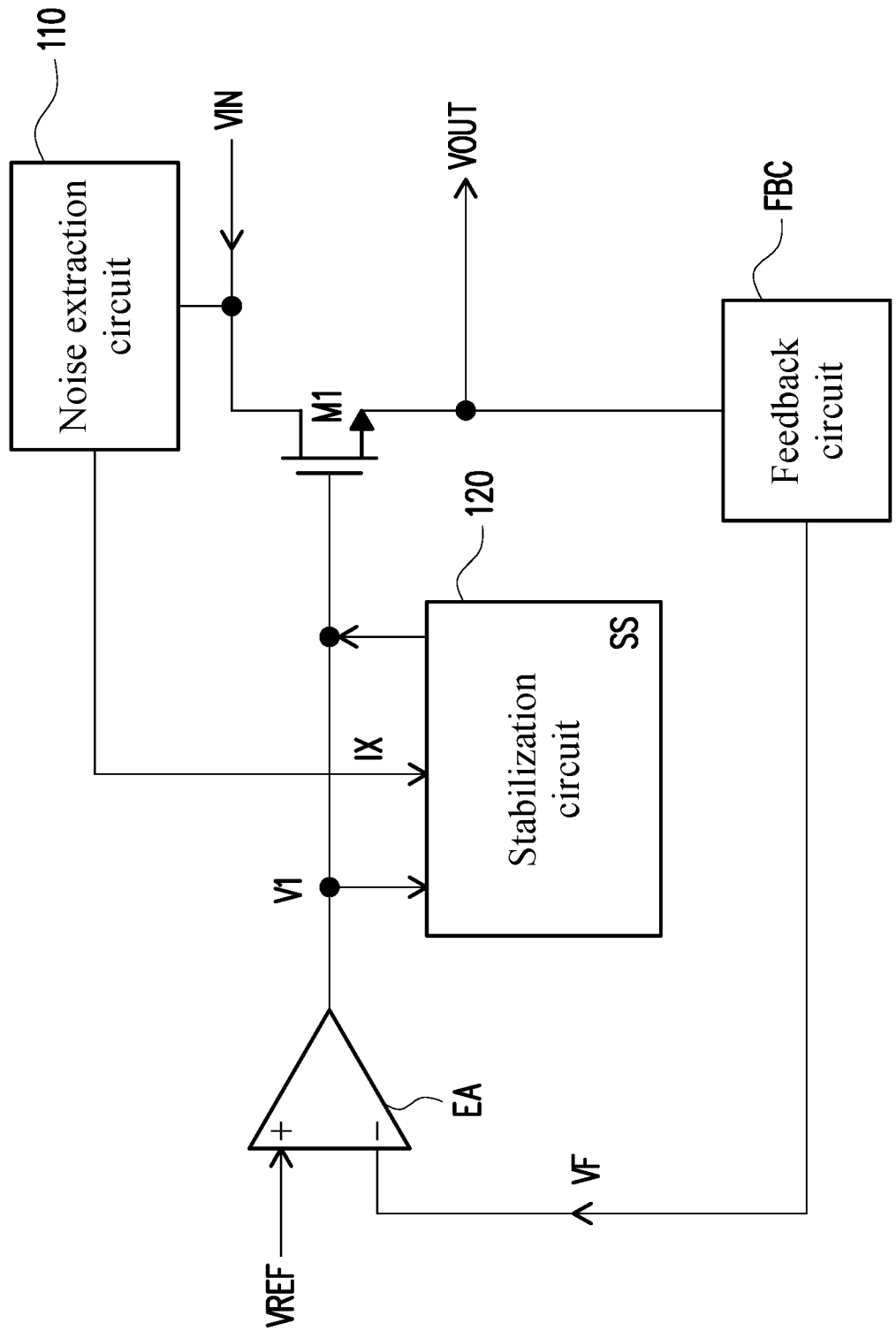
FIG. 1 is a schematic diagram of a voltage regulation circuit according to a first embodiment of the disclosure.

Some embodiments of the disclosure accompanied with drawings are described in detail as follows. The reference numerals used in the following description are regarded as the same or similar elements when the same reference numerals appear in different drawings.

These embodiments are only a part of the disclosure, and do not disclose all the possible implementations of the disclosure. To be more precise, the embodiments are only examples in the scope of the claims of the disclosure.

Please refer to FIG. 1, which is a schematic diagram of a voltage regulation circuit according to a first embodiment of the disclosure. In the embodiment, a voltage regulation circuit 100 includes an error amplifier EA, an output transistor M1, a noise extraction circuit 110, and a stabilization circuit 120. The error amplifier EA provides a control signal V1 in response to changes in a feedback voltage VF. The voltage value of the feedback voltage VF is related to the voltage value at the output terminal of the voltage regulation circuit 100. The output transistor M1 is coupled to the output terminal of the error amplifier EA. The output transistor M1 receives an input voltage signal VIN, and adjusts an output voltage signal VOUT at the output terminal of the voltage regulation circuit 100 in response to the control signal V1 and the input voltage signal VIN.

For example, the output transistor M1 is, for example, an N-type metal-oxide semiconductor field-effect transistor (MOSFET). The first terminal of the output transistor M1 receives the input voltage signal VIN. The control terminal of the output transistor M1 is coupled to the output terminal of the error amplifier EA and receives the control signal V1. The second terminal of the output transistor M1 serves as the output terminal of the voltage regulation circuit 100. The non-inverting input terminal of the error amplifier EA receives a reference voltage signal VREF. The inverting input terminal of the error amplifier EA receives the feedback voltage VF. The output terminal of the error amplifier EA is coupled to the output transistor M1. The error amplifier EA and the output transistor M1 may be at least part of the basic architecture of a low dropout (LDO) regulation circuit. The reference voltage signal VREF has a fixed voltage value. The voltage value of the feedback voltage VF and the voltage value of the output voltage signal VOUT are in a positive correlation. Therefore, the error amplifier EA adjusts the control signal V1 based on the changes in the feedback voltage VF. If the voltage value of the voltage signal VOUT is greater than a predetermined value, the voltage value of the feedback voltage VF rises to be greater than the voltage value of the reference voltage signal VREF. The voltage value of the control signal V1 is lowered. Therefore, the voltage value of the output voltage signal VOUT is lowered. Conversely, if the voltage value of the voltage signal VOUT is smaller than the predetermined value, the voltage value of the feedback voltage VF drops to be smaller than the voltage value of the reference voltage signal VREF. Therefore, the voltage value of the control signal V1 is increased. Therefore, the voltage value of the output voltage signal VOUT increases.

In the embodiment, the noise extraction circuit 110 extracts a noise of the input voltage signal VIN to provide a noise current signal Ix. The stabilization circuit 120 is coupled to the noise extraction circuit 110. The stabilization circuit 120 converts the noise current signal Ix into a stable signal SS. The stabilization circuit 120 provides the stable signal SS to the control terminal of the output transistor M1 in a high operating frequency range to cancel the noise of the input voltage signal VIN. The output voltage signal VOUT does not include the noise of the input voltage signal VIN. The operating frequency is the frequency of the voltage signal VIN.

Moreover, in an operating frequency range outside the high operating frequency range (e.g., at least one of a middle operating frequency range and a low operating frequency range), the stabilization circuit 120 stops providing the stable signal SS to the control terminal of the output transistor M1.

It is worth mentioning here that in the high operating frequency range, the stabilization circuit 120 is coupled to the error amplifier EA and uses the noise current signal Ix to cancel the interference caused by the noise accompanying the input voltage signal VIN, thereby stabilizing the output voltage signal VOUT. In this way, the voltage regulation circuit can have a high PSRR in the high operating frequency range.

In the embodiment, the voltage regulation circuit 100 may further include a feedback circuit FBC. The feedback circuit FBC is coupled between the output terminal of the voltage regulation circuit 100 and the error amplifier EA. The feedback circuit FBC converts the output voltage signal VOUT into the feedback voltage VF, and provides the feedback voltage VF to the error amplifier EA.

Figure 2:
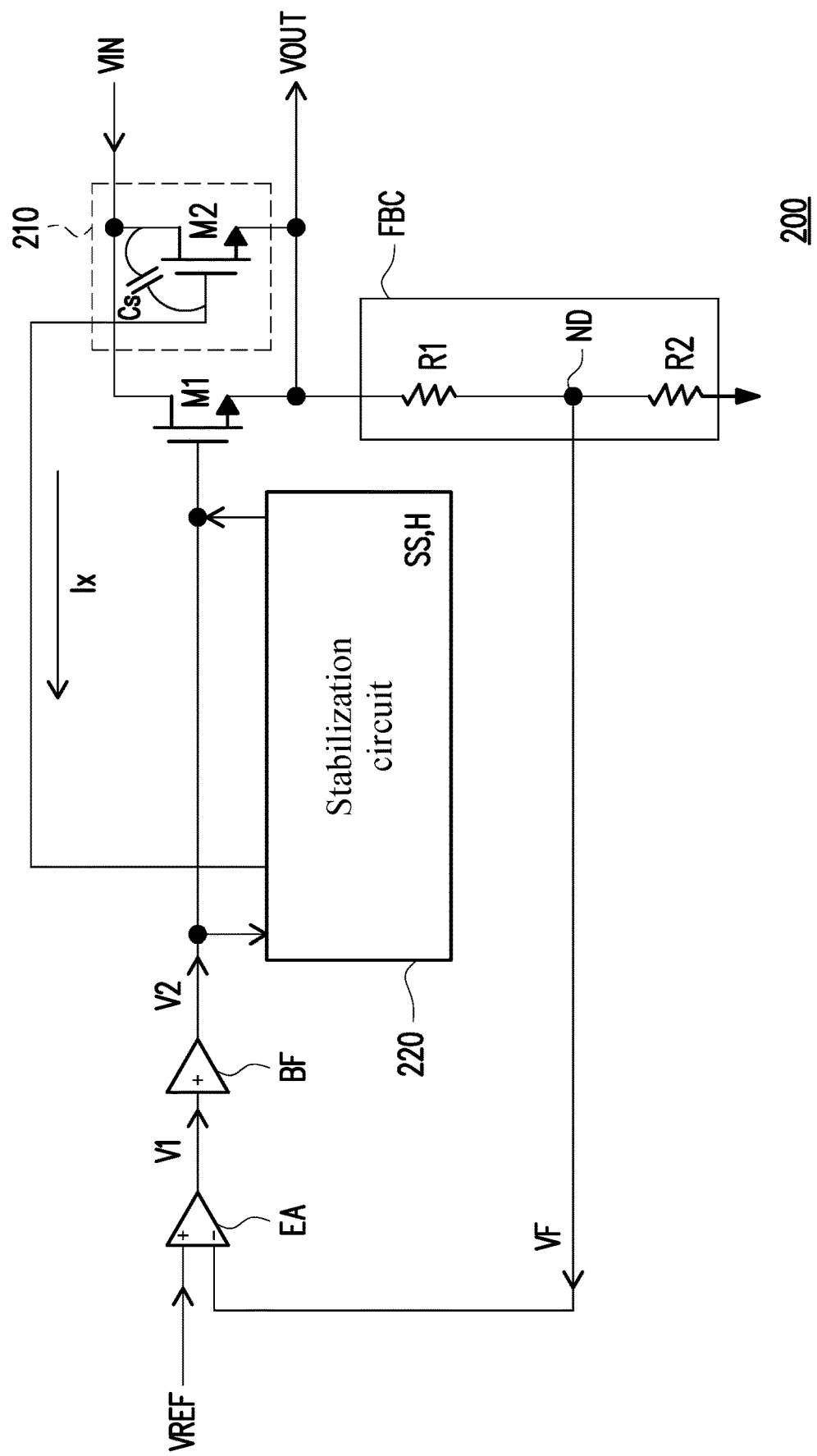
FIG. 2 is a schematic diagram of a voltage regulation circuit according to a second embodiment of the disclosure.

Please refer to FIG. 2, which is a schematic diagram of a voltage regulation circuit according to a second embodiment of the disclosure. In the embodiment, a voltage regulation circuit 200 includes the error amplifier EA, a buffer BF, the output transistor M1, a feedback circuit FBC, a noise extraction circuit 210, and a stabilization circuit 220. The implementations of the error amplifier EA and the output transistor M1 have already been clearly described in the first embodiment of FIG. 1, so the descriptions are not repeated here.

In the embodiment, the buffer BF is coupled between the output terminal of the error amplifier 210 and the output transistor M1. The buffer BF boosts the loop gain of the voltage regulation circuit 200. Further, the buffer BF receives the control signal V1 and provides a control signal V2 according to the control signal V1. The buffer BF provides a trans-conductance value through the conversion of the control signals V1 and V2. Therefore, the loop gain of the voltage regulation circuit 200 is increased based on the trans-conductance value.

In the embodiment, the feedback circuit FBC may be implemented by a voltage divider circuit. The feedback circuit FBC includes voltage dividing resistors R1 and R2. The voltage dividing resistors R1 and R2 are coupled in series between the output terminal of the voltage regulation circuit 200 and a reference ground terminal (e.g., the ground). The first terminal of the voltage dividing resistor R1 is coupled to the output terminal of the voltage regulation circuit 200. The second terminal of the voltage dividing resistor R1 is coupled to a voltage dividing node ND. The first terminal of the voltage dividing resistor R2 is coupled to the voltage dividing node ND. The second terminal of the voltage dividing resistor R2 is coupled to the reference ground terminal. The voltage dividing node ND is coupled to the inverting input terminal of the error amplifier EA. The feedback circuit FBC performs a voltage dividing operation on an output voltage signal VOUT to generate a feedback voltage VF at the voltage dividing node ND.

In the embodiment, the noise extraction circuit 210 includes an auxiliary transistor M2. The first terminal of the auxiliary transistor M2 receives an input voltage signal VIN. The control terminal of the auxiliary transistor M2 is coupled to the stabilization circuit 220. A parasitic capacitance Cs exists between the first terminal of the auxiliary transistor M2 and the control terminal of the auxiliary transistor M2. The auxiliary transistor M2 extracts a noise of the input voltage signal VIN through the parasitic capacitance Cs to provide the noise current signal Ix. The auxiliary transistor M2 provides the noise current signal Ix to the stabilization circuit 220 at the control terminal of the auxiliary transistor M2. The stabilization circuit 220 converts the noise current signal Ix into the stable signal SS.

In addition, the second terminal of the auxiliary transistor M2 is coupled to the output terminal of the voltage regulation circuit 200. The auxiliary transistor M2 does not engage in the transmission of power. Therefore, in design, the size of the auxiliary transistor M2 is smaller than the size of the output transistor M1. For example, the layout area of the auxiliary transistor M2 is approximately equal to 1% of the layout area of the output transistor M1, and the disclosure is not limited thereto.

In the embodiment, the stabilization circuit 220 converts the noise current signal Ix into the stable signal SS. The stabilization circuit 220 provides the stable signal SS to the control terminal of the output transistor M1 in the high operating frequency range. In the embodiment, when the stable signal SS is provided to the control terminal of the output transistor M1, the stable signal SS has a transfer function H relative to the control signal V2. The transfer function H can cancel the phase of the pole in the high operating frequency range. Thus, the voltage regulation circuit 200 can have a higher power supply rejection ratio (PSRR) in the high operating frequency range.

Figure 3:
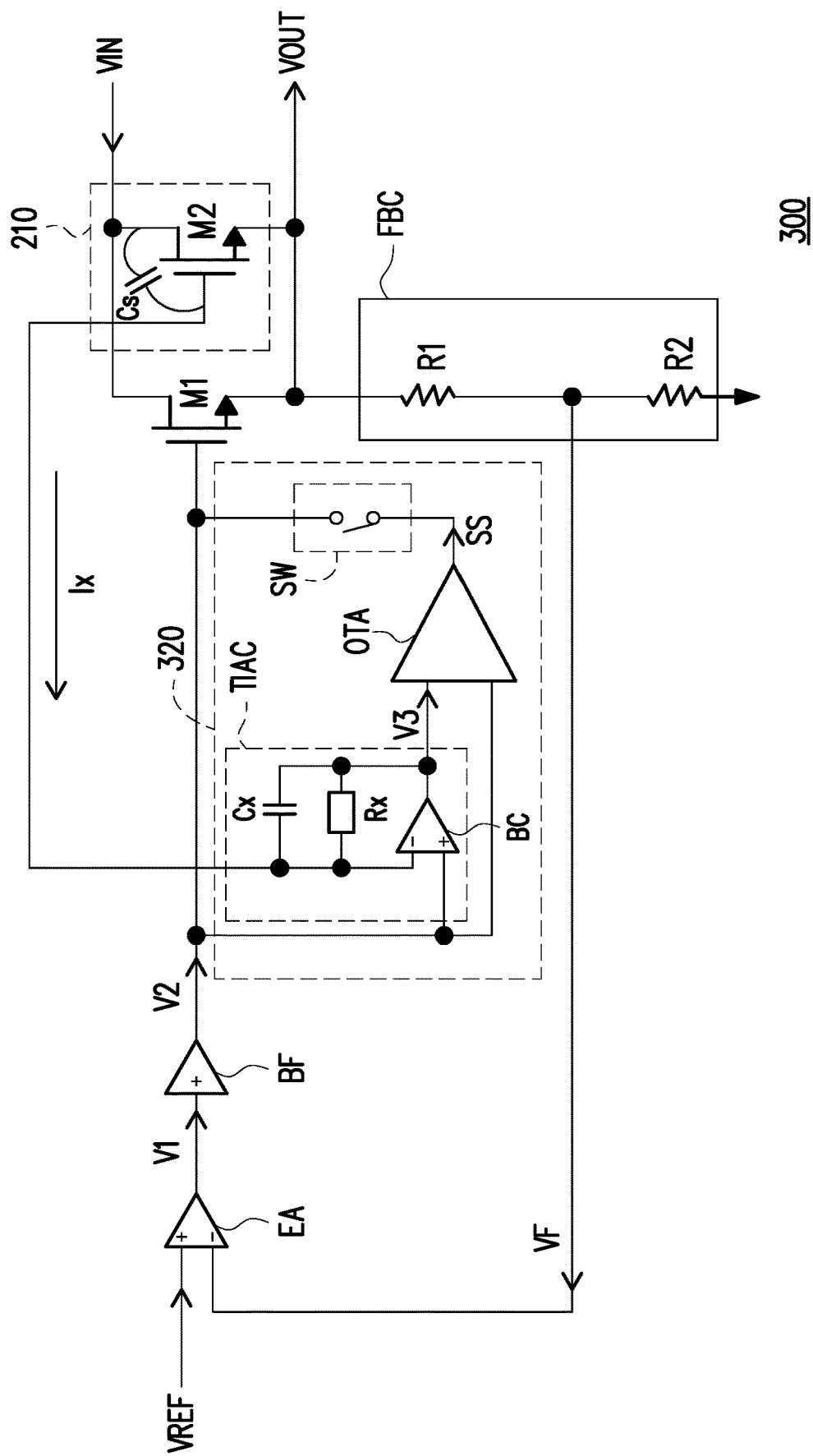
FIG. 3 is a schematic diagram of a voltage regulation circuit according to a third embodiment of the disclosure.

Please refer to FIG. 3, which is a schematic diagram of a voltage regulation circuit according to a third embodiment of the disclosure. In the embodiment, a voltage regulation circuit 300 includes the error amplifier EA, the buffer BF, the output transistor M1, the feedback circuit FBC, the noise extraction circuit 210, and a stabilization circuit 320. The implementations of the error amplifier EA, the buffer BF, the output transistor M1, the feedback circuit FBC, and the noise extraction circuit 210 have been clearly described in the various embodiments of FIG. 1 and FIG. 2, so the descriptions are not repeated here.

In the embodiment, the stabilization circuit 320 includes amplifier circuits TIAC and OTA, and a switch SW. The amplifier circuit TIAC receives the noise current signal Ix from the noise extraction circuit 210. The amplifier circuit TIAC converts the noise current signal Ix into a conversion signal V3 based on a first transfer function. The amplifier circuit OTA is coupled to the output terminal of the amplifier circuit TIAC. The amplifier circuit OTA converts the conversion signal V3 into a stable signal SS based on a second transfer function.

In the embodiment, the switch SW is coupled between the output terminal of the amplifier circuit OTA and the control terminal of the output transistor M1. The switch SW is turned on in the high operating frequency range (or referred to as a first operating frequency range). The amplifier circuit OTA is coupled to the output transistor M1. Therefore, in the first operating frequency range, the stable signal SS is provided to the control terminal of the output transistor M1. For example, in the first operating frequency range, the stabilization circuit 320 or an external circuit provides a first switch control signal to turn on the switch SW. In the embodiment, the switch SW may be implemented by any type of transistor switch or transmission gate.

In the first operating frequency range, the phase of the pole of the amplifier circuit TIAC and the phase of the pole of the amplifier circuit OTA are opposite to each other. Therefore, the stabilization circuit 320 can cancel the interference caused by the noise of the input voltage signal VIN.

In at least one operating frequency range (or referred to as a second operating frequency range) outside the high operating frequency range, the switch SW is turned off. The amplifier circuit OTA is decoupled from the output transistor M1. The stable signal SS is not provided to the control terminal of the output transistor M1. Therefore, in the second operating frequency range, the stable signal SS is not provided to the control terminal of the output transistor M1. For example, in the second operating frequency range, the stabilization circuit 320 or the external circuit provides a second switch control signal to turn off the switch SW.

Further, in the embodiment, the amplifier circuit TIAC includes a resistor Rx and a capacitor Cx. The first terminal of the resistor Rx receives the noise current signal Ix. The second terminal of the resistor Rx is coupled to the output terminal of the amplifier circuit TIAC. The capacitor Cx is coupled in parallel with the resistor Rx. In the embodiment, the amplifier circuit TIAC is used as a trans-impedance amplifier. The amplifier circuit TIAC converts the noise current signal Ix into the conversion signal V3 in the form of a voltage. That is, the conversion signal V3 is a voltage signal.

In the embodiment, the first transfer function is determined according to the resistance value of the resistor Rx and the capacitance value of the capacitor Cx. The first transfer function is shown in a formula (1).

$$Z(s) = \frac{r\_Rx}{(1 + s \times r\_Rx \times c\_Cx)} \quad \text{formula (1)}$$

Z(s) represents the first transfer function. The first transfer function is the Laplace function. s represents the complex term of the Laplace transform. r_Rx represents the resistance value of the resistor Rx. c_Cx represents the capacitance value of the capacitor Cx. In the embodiment, the pole provided by the amplifier circuit TIAC is equal to the inverse of the product of the resistance value of the resistor Rx and the capacitance value of the capacitor Cx, as shown in a formula (2).

$$p1 = \frac{1}{(r\_Rx \times c\_Cx)} \quad \text{formula (2)}$$

p1 represents the pole of the amplifier circuit TIAC.

In the embodiment, the amplifier circuit TIAC further includes a bias circuit BC. The bias circuit BC biases the conversion signal V3 based on the control signal V2. In the embodiment, the bias circuit BC is implemented with an operational amplifier. The first input terminal (i.e., the inverting input terminal) of the bias circuit BC receives the noise current signal Ix. The second input terminal (i.e., the non-inverting input terminal) of the bias circuit BC receives the control signal V2. The output terminal of the bias circuit BC is coupled to the amplifier circuit OTA.

In the embodiment, the amplifier circuit OTA is implemented by a trans-conductance amplifier. The first input terminal of the amplifier circuit OTA receives the conversion signal V3. The second input terminal of the amplifier circuit OTA receives the control signal V2. The output terminal of the amplifier circuit OTA is coupled to the switch SW. The amplifier circuit OTA converts the conversion signal V3 into the stable signal SS in the form of a current. That is, the stable signal SS is a current signal.

Further, in the embodiment, the second transfer function is determined according to the loop gain of the voltage regulation circuit 300 and the pole of the amplifier circuit OTA. The second transfer function is shown in a formula (3).

$$A(s) = \frac{K}{(1 + s \times p2)} \quad \text{formula (3)}$$

A(s) represents the second transfer function. The second transfer function is also the Laplace function. K represents the loop gain (a direct current (DC) loop gain) of the voltage regulation circuit 300. K is related to the trans-conductance value provided by the buffer BF. p2 represents the pole of the amplifier circuit OTA. The pole of the amplifier circuit OTA is related to the operating frequency of the input voltage signal VIN.

In the embodiment, based on the design of the voltage regulation circuit 300, a transfer function T between the control signal V2 and the input voltage signal VIN is shown in a formula (4).

$$T = \frac{V2(s)}{VIN(s)} = \frac{s \times c\_Cs \times r\_Rx \times K}{(s \times c\_Cs \times (1 + s \times r\_Rx \times c\_Cx) \times \left(1 + \frac{s}{p2}\right) + r\_Rx \times K)} \quad \text{formula (4)}$$

c_Cs represents the capacitance value of the parasitic capacitance Cs. In the low operating frequency range (e.g., less than 1 kHz), the transfer function T tends to approach zero. This means that the transfer function T does not vary in the low operating frequency range regardless of whether the switch SW is turned on. The PSRR is not affected by the switch SW.

In the middle operating frequency range (e.g., 1 kHz to hundreds of kHz), the transfer function T approximates to s×c_Cs. This means that the addition of the stabilization circuit 320 reduces the PSRR of the voltage regulation circuit 300. That is, in the middle operating frequency range, the switch SW being turned on reduces the PSRR of the voltage regulation circuit 300. Therefore, in the embodiment, at least in the middle operating frequency range, the switch SW is turned off.

In the high operating frequency range (e.g., hundreds of kHz to hundreds of MHz), the transfer function T is shown in a formula (5).

$$T = \frac{V2(s)}{VIN(s)} \cong \frac{\text{r\_Rx} \times K}{(1 + s \times \text{r\_Rx} \times \text{c\_Cx}) \times \left(1 + \frac{s}{p2}\right)} \quad \text{formula (5)}$$

It should be noted that the formula (5) is approximately equal to the product of the first transfer function and the second transfer function. In addition, in the formula (5), the phases of the poles p1 and p2 are opposite to each other. The phases of the poles p1 and p2 produces a 180° delay on the control signal V2. That is, the noise on the path from the control signal V2 to the output voltage signal VOUT and the noise on the path from the input voltage signal VIN to the output voltage signal VOUT have an inverse relationship. That is, in the high operating frequency range, when the switch SW is turned on, the noise of the voltage signal VOUT is canceled. Thus, in the high operating frequency range, the PSRR of the voltage regulation circuit 300 is greatly improved.

Figure 4:
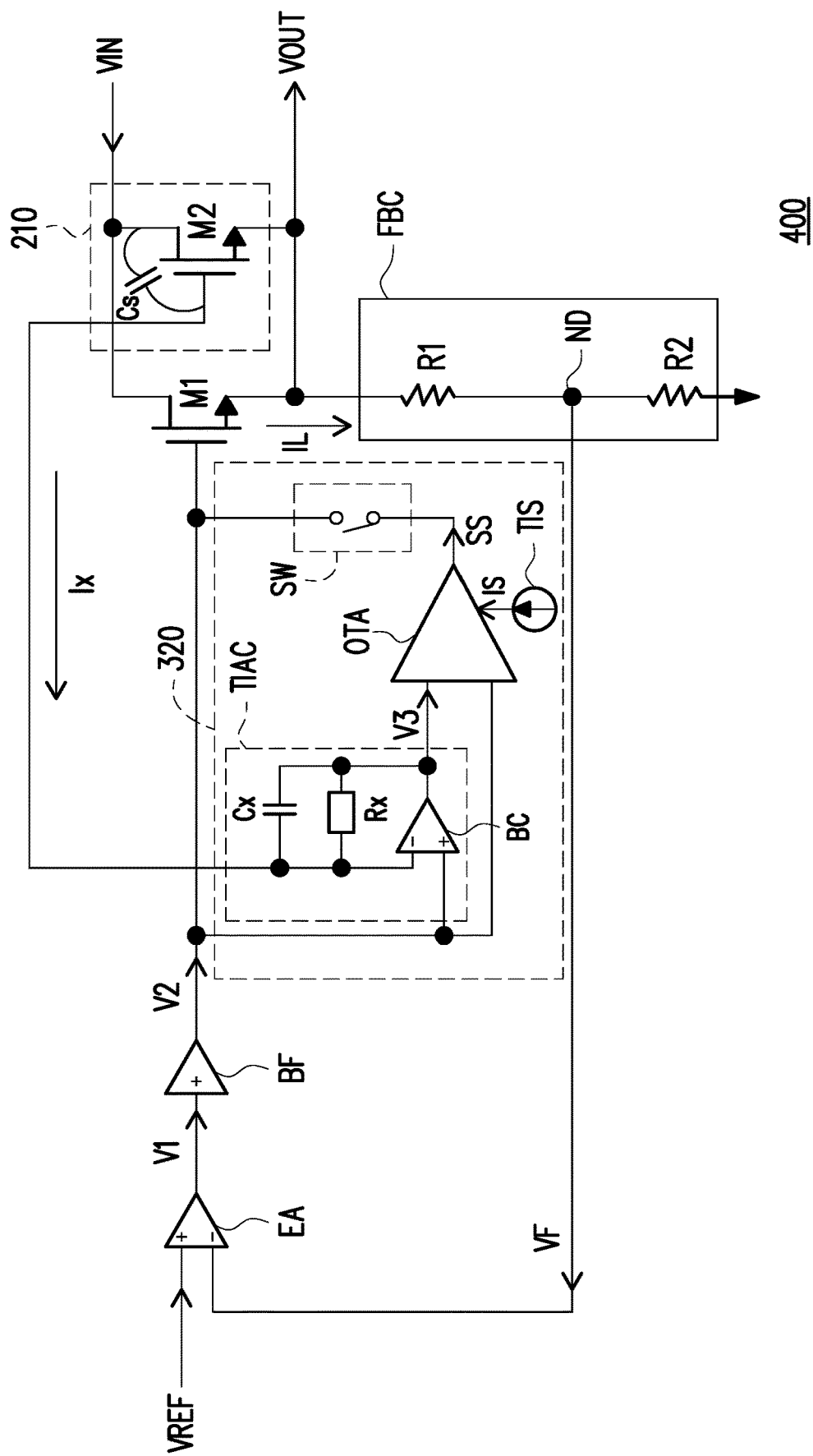
FIG. 4 is a schematic diagram of a voltage regulation circuit according to a fourth embodiment of the disclosure.

Please refer to FIG. 4, which is a schematic diagram of a voltage regulation circuit according to a fourth embodiment of the disclosure. In the embodiment, a voltage regulation circuit 400 includes the error amplifier EA, the buffer BF, the output transistor M1, the feedback circuit FBC, the noise extraction circuit 210, the stabilization circuit 320, and a current source TIS. The implementations of the error amplifier EA, the buffer BF, the output transistor M1, the feedback circuit FBC, the noise extraction circuit 210, and the stabilization circuit 320 have been clearly described in the various embodiments of FIGS. 1 to 3, so the descriptions are not repeated here.

In the embodiment, the current source TIS is coupled to the amplifier circuit OTA. The current source TIS tracks a load current IL flowing through the output transistor M1 to provide a reference current IS. The current value of the reference current IS is proportional to the current value of the load current IL. The amplifier circuit OTA can determine the pole of the amplifier circuit OTA based on the reference current IS. It should be noted that the amplifier circuit OTA receives the reference current IS and learns the variation of the load current IL according to the variation of the reference current IS. In the embodiment, the amplifier circuit OTA can learn the operating frequency of the input voltage signal VIN according to the waveform of the reference current IS, and determine the pole of the amplifier circuit OTA based on the operating frequency of the input voltage signal VIN. That is, the pole of the amplifier circuit OTA can follow the operating frequency of the input voltage signal VIN.

Figure 5:
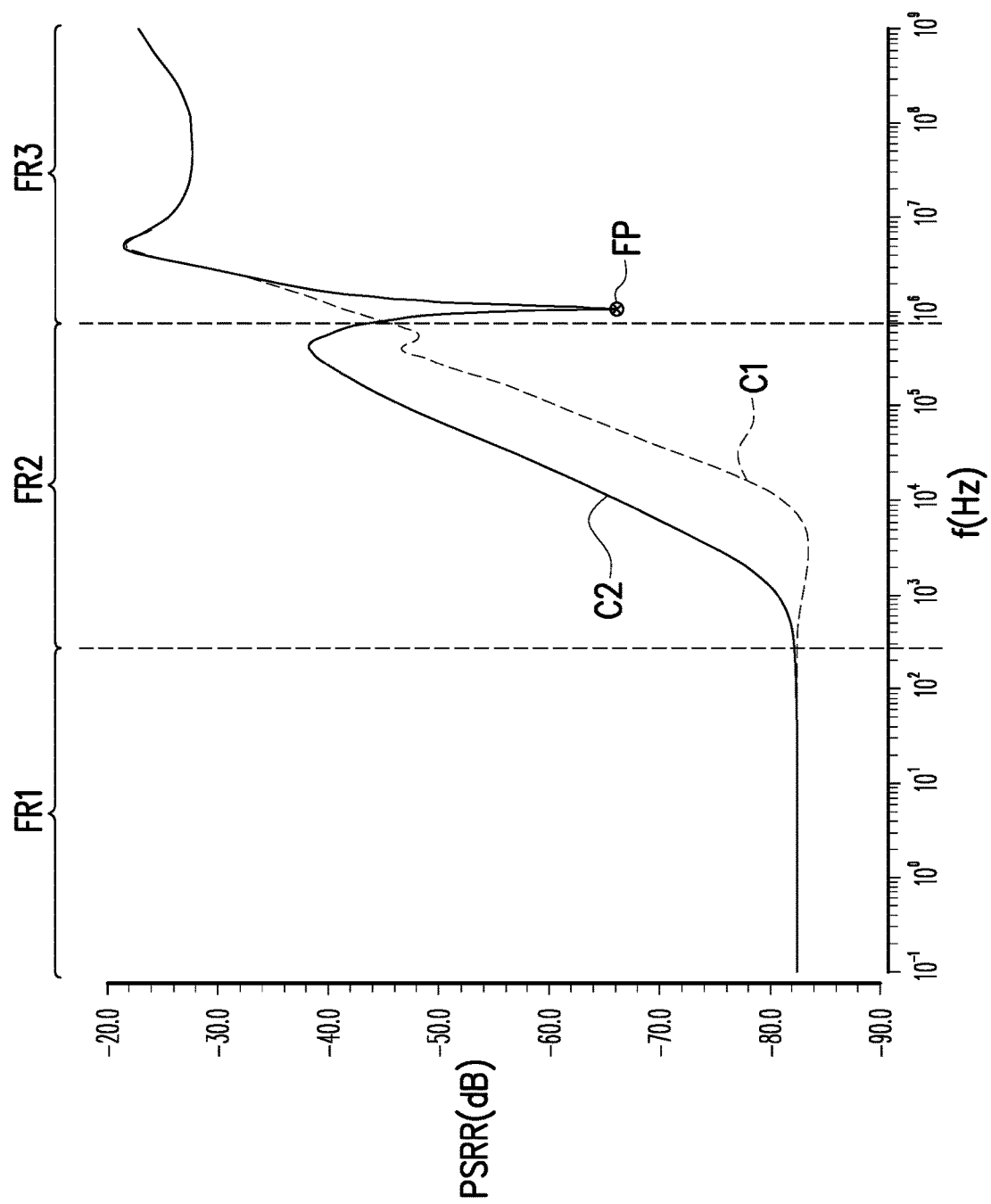
FIG. 5 illustrates simulation results of the PSRR according to an embodiment of the disclosure.

Please refer to FIGS. 3, 4, and 5 at the same time. FIG. 5 illustrates simulation results of the PSRR according to an embodiment of the disclosure. The simulation results of the PSRR shown in FIG. 5 are applicable to the embodiments of FIGS. 3 and 4. In the embodiment, the vertical axis of the simulation results is the PSRR. The unit of the vertical axis is a decibel (dB). The horizontal axis of the simulation results is the frequency f. The unit of the horizontal axis is a hertz (Hz). The simulation results show curves C1 and C2. The curve C1 represents the simulation result of the PSRR when the switch SW is turned off. The curve C2 represents the simulated result of the PSRR when the switch SW is turned on.

In the operating frequency range FR1 (less than about 300 kHz), the curves C1 and C2 remain substantially at about −82.5 dB. That is, regardless of whether the switch SW is turned off or turned on, a high PSRR is maintained.

In the operating frequency range FR2 (about 300 kHz to about 700 kHz), both the curves C1 and C2 rise upward. That is, the PSRR drops. The PSRR result of the curve C1 is better than the PSRR result of the curve C2. In light of the above, when the switch SW is turned off, the voltage regulation circuit 300 has a better PSRR.

In the operating frequency range FR3 (greater than about 700 kHz), the curve C1 continues to rise upward. The curve C2 then turns, and drops significantly at the operating frequency FP of about 1.09 MHz. In light of the above, when the switch SW is turned on, the stabilization circuit 320 can enable the voltage regulation circuit 300 to have a better PSRR. Taking the embodiment as an example, when the switch SW is turned on at the operating frequency FP, the PSRR of the voltage regulation circuit 300 is about −67 dB. When the switch SW is turned off, the voltage regulation circuit 300 has a better PSRR of about −41.9 dB. When the switch SW is turned on, the PSRR of the voltage regulation circuit 300 is improved by about −25 dB.

Based on the design of the buffer BF, the loop gain of the voltage regulation circuit 300 may be further improved. Therefore, in the operating frequency range FR3, the PSRR improvement magnitude of the voltage regulation circuit 300 may be further increased.

In addition, the amplifier circuit OTA may learn the operating frequency FP of the input voltage signal VIN based on the tracking of the reference current IS. Thus, the pole of the amplifier circuit OTA can follow the operating frequency FP of the input voltage signal VIN. Therefore, once the operating frequency FP of the voltage signal VIN is changed, the pole of the amplifier circuit OTA is correspondingly changed. In this way, in the operating frequency range FR3, the stabilization circuit 320 can follow the operating frequency FP of the input voltage signal VIN. The voltage regulation circuit 300 can maintain a better PSRR.

In summary, the voltage regulation circuit of the disclosure extracts the noise of the input voltage signal to provide the noise current signal. In the high operating frequency range, the voltage regulation circuit can utilize the noise current signal to cancel the interference caused by the noise accompanying the input voltage signal, thereby stabilizing the output voltage signal. In this way, the voltage regulation circuit has a high PSRR in the high operating frequency range. The voltage regulation circuit utilizes the buffer to increase the loop gain of the voltage regulation circuit. Therefore, the PSRR improvement magnitude of the voltage regulation circuit may be further improved. In addition, the voltage regulation circuit can further adjust the pole in the operating frequency range based on the operating frequency of the input voltage signal. In this way, in the high operating frequency range, the voltage regulation circuit can follow the operating frequency of the input voltage signal. The voltage regulation circuit can maintain a better PSRR.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A voltage regulation circuit, comprising:
an error amplifier, configured to provide a control signal in response to a change in a feedback voltage, wherein a voltage value of the feedback voltage is related to a voltage value at an output terminal of the voltage regulation circuit;
an output transistor, a control terminal of the output transistor coupled to an output terminal of the error amplifier, and the output transistor configured to receive an input voltage signal and adjust an output voltage signal at the output terminal of the voltage regulation circuit in response to the control signal and the input voltage signal;
a noise extraction circuit, configured to extract a noise of the input voltage signal to provide a noise current signal; and
a stabilization circuit, coupled to the noise extraction circuit, and configured to convert the noise current signal into a stable signal and provide the stable signal to the control terminal of the output transistor in a high operating frequency range to cancel interference caused by the noise of the input voltage signal,
wherein the stabilization circuit comprises:
a first amplifier circuit, configured to convert the noise current signal into a conversion signal based on a first transfer function;
a second amplifier circuit, coupled to an output terminal of the first amplifier circuit, and configured to convert the conversion signal into the stable signal based on a second transfer function; and
a switch, coupled between an output terminal of the second amplifier circuit and the control terminal of the output transistor, and configured to:
be turned on in the high operating frequency range, so that the second amplifier circuit is coupled to the output transistor, and
be turned off in an operating frequency range outside the high operating frequency range, so that the second amplifier circuit is decoupled from the output transistor.

2. The voltage regulation circuit according to claim 1, wherein in an operating frequency range outside the high operating frequency range, the stabilization circuit stops providing the stable signal to the control terminal of the output transistor.

3. The voltage regulation circuit according to claim 1, wherein the noise extraction circuit comprises:
an auxiliary transistor, a first terminal of the auxiliary transistor receiving the input voltage signal, and a control terminal of the auxiliary transistor coupled to the stabilization circuit,
wherein a parasitic capacitance exists between the first terminal of the auxiliary transistor and the control terminal of the auxiliary transistor,
wherein the auxiliary transistor is configured to extract the noise of the input voltage signal through the parasitic capacitance to provide the noise current signal.

4. The voltage regulation circuit according to claim 3, wherein a second terminal of the auxiliary transistor is coupled to the output terminal of the voltage regulation circuit.

5. The voltage regulation circuit according to claim 1, further comprising:
a buffer, coupled between the output terminal of the error amplifier and the output transistor, and configured to boost a loop gain of the voltage regulation circuit.

6. The voltage regulation circuit according to claim 1, wherein in the high operating frequency range, a phase of a pole of the first amplifier circuit and a phase of a pole of the second amplifier circuit are opposite to each other, so as to cancel the interference caused by the noise of the input voltage signal.

7. The voltage regulation circuit according to claim 1, wherein the first amplifier circuit comprises:
a resistor, a first terminal of the resistor receiving the noise current signal, and a second terminal of the resistor coupled to the output terminal of the first amplifier circuit; and
a capacitor, coupled in parallel with the resistor,
wherein the first transfer function is determined according to a resistance value of the resistor and a capacitance value of the capacitor.

8. The voltage regulation circuit according to claim 7, wherein the first amplifier circuit further comprises:
a bias circuit, configured to bias the conversion signal based on the control signal.

9. The voltage regulation circuit according to claim 8, wherein:
the bias circuit is implemented with an operational amplifier,
a first input terminal of the bias circuit receives the noise current signal,
a second input terminal of the bias circuit receives the control signal, and
an output terminal of the bias circuit is coupled to the second amplifier circuit.

10. The voltage regulation circuit according to claim 1, wherein:
the second amplifier circuit is implemented by a transconductance amplifier,
a first input terminal of the second amplifier circuit receives the conversion signal,
a second input terminal of the second amplifier circuit receives the control signal, and
the output terminal of the second amplifier circuit is coupled to the switch.

11. The voltage regulation circuit according to claim 1, wherein the second transfer function is determined according to a loop gain of the voltage regulation circuit and a pole of the second amplifier circuit.

12. The voltage regulation circuit according to claim 1, wherein the stabilization circuit further comprises:
a current source, coupled to the second amplifier circuit, and configured to track a load current flowing through the output transistor to provide a reference current,
wherein a current value of the reference current is proportional to a current value of the load current.

13. The voltage regulation circuit according to claim 12, wherein the second amplifier circuit determines a pole of the second amplifier circuit based on the reference current.

14. The voltage regulation circuit according to claim 1, further comprising:
a feedback circuit, coupled to the output terminal of the voltage regulation circuit and the error amplifier, and configured to convert the output voltage signal into the feedback voltage and provide the feedback voltage to the error amplifier.

* * * * *